US008228800B2

(12) United States Patent
Mehrotra et al.

(10) Patent No.: US 8,228,800 B2
(45) Date of Patent: Jul. 24, 2012

(54) OPTIMIZED TRANSPORT PROTOCOL FOR DELAY-SENSITIVE DATA

(75) Inventors: Sanjeev Mehrotra, Kirkland, WA (US); Ying-zong Huang, Cambridge, MA (US); Jin Li, Sammamish, WA (US); Sayandeep Sen, Madison, WI (US); Manish Jain, Redmond, WA (US); Sudipta Sengupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 12/364,520

(22) Filed: Feb. 3, 2009

(65) Prior Publication Data

US 2010/0195488 A1 Aug. 5, 2010

(51) Int. Cl.
*G06F 11/00* (2006.01)
(52) U.S. Cl. ...................................................... 370/235
(58) Field of Classification Search .......... 370/229–235; 714/746–752
See application file for complete search history.

(56) References Cited

U.S. PATENT DOCUMENTS

| | | | |
|---|---|---|---|
| 6,167,060 A | 12/2000 | Vargo et al. | |
| 6,278,716 B1 | 8/2001 | Rubenstein | |
| 6,421,387 B1 | 7/2002 | Rhee | |
| 6,487,690 B1 | 11/2002 | Schuster et al. | |
| 6,789,123 B2 | 9/2004 | Li et al. | |
| 7,366,132 B2 | 4/2008 | Ramakrishnan et al. | |
| 7,447,148 B2 | 11/2008 | Gao et al. | |
| 2002/0105952 A1* | 8/2002 | Bonomi et al. | 370/394 |
| 2003/0016630 A1* | 1/2003 | Vega-Garcia et al. | 370/252 |
| 2004/0017773 A1* | 1/2004 | Piche et al. | 370/232 |
| 2004/0052274 A1* | 3/2004 | Wang et al. | 370/468 |
| 2006/0092836 A1* | 5/2006 | Kwan et al. | 370/229 |
| 2006/0159098 A1* | 7/2006 | Munson et al. | 370/394 |
| 2007/0288824 A1* | 12/2007 | Yeo et al. | 714/749 |
| 2009/0059917 A1* | 3/2009 | Lussier et al. | 370/389 |

OTHER PUBLICATIONS

Rubenstein, D., J. Kurose, D. Towsley, Real-time reliable multicast using proactive forward error correction, Proc. 8th IEEE Int'l Workshop Nossdav, Cambridge, Jul. 1998.
Bolot, J., A. Vega-Garcia, The case for FEC—based error control for packet audio in the Internet, to appear in ACM Multimedia Systems, retrieved Nov. 19, 2008 from http://citeseerx.ist.psu.edu/viewdoc/download?doi=10.1.1.54.4432.

(Continued)

*Primary Examiner* — Kwang B Yao
*Assistant Examiner* — Kenan Cehic
(74) *Attorney, Agent, or Firm* — Lyon & Harr, LLP; Richard T. Lyon

(57) ABSTRACT

Transmission delays are minimized when packets are transmitted from a source computer over a network to a destination computer. The source computer measures the network's available bandwidth, forms a sequence of output packets from a sequence of data packets, and transmits the output packets over the network to the destination computer, where the transmission rate is ramped up to the measured bandwidth. In conjunction with the transmission, the source computer monitors a transmission delay indicator which it computes using acknowledgement packets it receives from the destination computer. Whenever the indicator specifies that the transmission delay is increasing, the source computer reduces the transmission rate until the indicator specifies that the delay is unchanged. The source computer dynamically decides whether each output packet will be a forward error correction packet or a single data packet, where the decision is based on minimizing the expected transmission delays.

16 Claims, 5 Drawing Sheets

OTHER PUBLICATIONS

Lucas, M. T., B. J. Dempsey, A. C. Weaver, Distributed error recovery for continuous media data in wide-area multicast, University of Virginia, Technical Report, Jul. 1995, Charlottesville, VA, USA.

Rhee, I., S. R. Joshi, FEC—based loss recovery for interactive video transmission, IEEE Int'l Conf. on Multimedia Computing and Systems, Jul. 1999, vol. 1., pp. 250-256, Florence, Italy.

Rizzo, L., L. Vicisano, A reliable multicast data distribution protocol based on software FEC techniques, The Fourth IEEE Workshop on High-Performance Communication Systems, Jun. 1997, pp. 116-125.

* cited by examiner

OPTIMIZED TRANSPORT PROTOCOL FOR DELAY-SENSITIVE DATA

BACKGROUND

Generally speaking a transport protocol operates within a layered framework of computer networking components and enables a local application hosted on one computer to transmit data over an underlying network to, and receive data over the network from, a remote application hosted on another computer. The transport protocol provides the local and remote applications with a uniform data communication interface that hides the specifics of the topology of the network that interconnects their host computers, and also hides the specifics of the physical connection between their host computers and the network. A variety of transport protocols exist each of which supports a different set of data communication services and capabilities. The Transmission Control Protocol (TCP) is a popular example of a transport protocol which operates throughout the Internet.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Optimized transport protocol (OTP) technique embodiments described herein generally involve minimizing transmission delays when data packets generated by a local application hosted on a source computer are transmitted over a data communications network to a remote application hosted on a destination computer. In one exemplary embodiment the source computer first measures the network's currently available bandwidth. A sequence of data packets generated by the local application are then input into a transmit queue on the source computer. The source computer then forms a sequence of output packets from the data packets in the transmit queue. The source computer then transmits the sequence of output packets over the network to the remote application, where the rate of transmission is ramped up to the measured bandwidth. In conjunction with the transmission, the source computer monitors a transmission delay indicator which it routinely computes using acknowledgement packets it receives from the destination computer. Whenever the indicator specifies that the transmission delay is increasing, the source computer reduces the rate of transmission until the indicator specifies that the delay is unchanged.

In another exemplary embodiment of the OTP technique the source computer dynamically decides for each output packet, whether the output packet will be a forward error correction packet or a single data packet, where the decision is based on minimizing the expected transmission delays due to packet loss and congestion in the network. The source computer then forms each output packet from one or more data packets based on the decision.

DESCRIPTION OF THE DRAWINGS

The specific features, aspects, and advantages of the optimized transport protocol (OTP) technique embodiments described herein will become better understood with regard to the following description, appended claims, and accompanying drawings where:

DETAILED DESCRIPTION

In the following description of optimized transport protocol (OTP) technique embodiments reference is made to the accompanying drawings which form a part hereof, and in which are shown, by way of illustration, specific embodiments in which the technique can be practiced. It is understood that other embodiments can be utilized and structural changes can be made without departing from the scope of the OTP technique embodiments.

The term "transmission opportunity" is used herein to refer to a particular point in time when a packet of data can be transmitted over a network from its source computer to its destination computer. Transmission opportunities occur in succession over time. The term "packet transmission delay" is used herein to refer to the period of time between when a packet is transmitted from a source computer over the network, and when the packet is successfully received over the network by a destination computer. The term "round-trip time" is used herein to refer to the packet transmission delay plus the time it takes for the source computer to receive an acknowledgement over the network from the destination computer that it successfully received the particular packet. The term "original packet delay" is used herein to refer to the period of time between when an original packet is input into a transmit queue on the source computer, and when the original packet is successfully decoded by a packet decoder on the destination computer.

The term "time until an original packet becomes useful" is used herein to refer to the period of time between when an original packet is input into the transmit queue on the source computer, and when the original packet becomes useful to a remote application on the destination computer. Generally speaking and as will be described in more detail hereafter, an original packet only becomes useful to the remote application after it and the other original packets upon which it depends, have been successfully decoded by the packet decoder on the destination computer. In the case where the remote application requires that the original packets be received over the network in order, each original packet will depend on all the other original packets which precede it. Thus, in this case the time until the original packet becomes useful is the period of time between when an original packet is input into the transmit queue on the source computer, and when the original packet and all the other preceding original packets have been successfully decoded by the packet decoder on the destination computer.

1.0 Network Communications Framework

Figure 1:
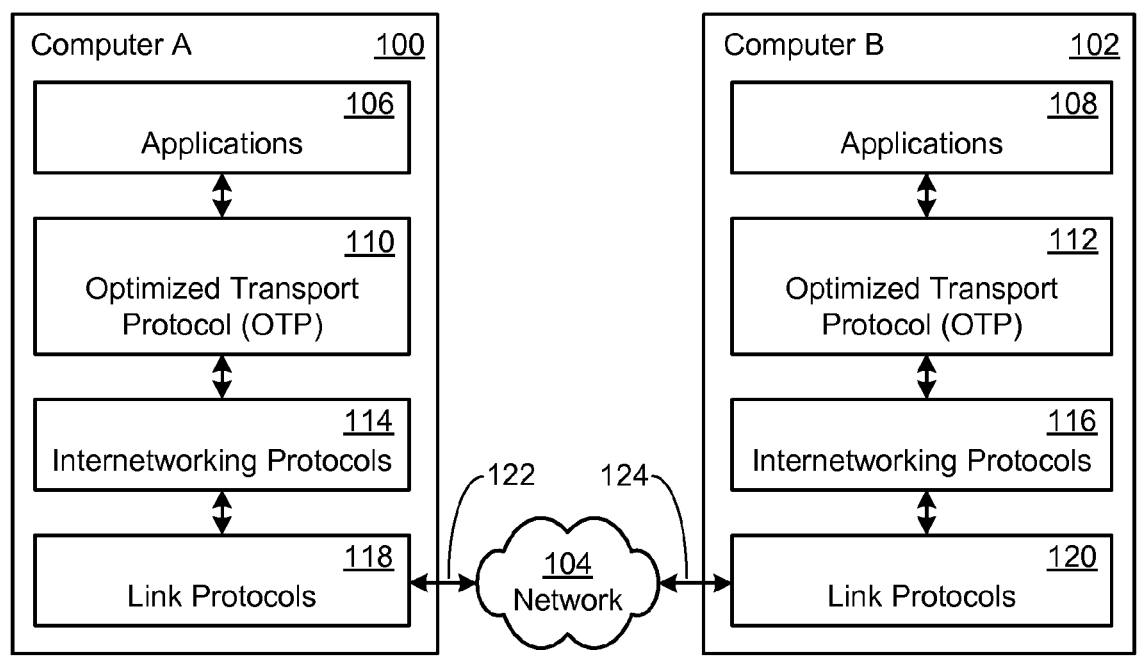
FIG. 1 is a diagram illustrating an exemplary embodiment, in simplified form, of a layered network communications framework for the OTP technique embodiments.

FIG. 1 illustrates an exemplary embodiment, in simplified form, of a layered network communications framework for the OTP technique embodiments described herein. Generally speaking and as exemplified in FIG. 1, the framework enables different computers 100/102 to communicate with one another over an underlying network 104. The framework defines a hierarchical four-layer model within which each computer 100/102 operates. Applications 106/108 are hosted in the upper-most layer of the framework on each computer 100/102. A particular local application 106 hosted on one computer 100 can generate a sequence of one or more data packets (hereafter referred to as "original data packets" or simply "original packets") which either can be communicated to another local application 106 hosted on the same computer 100, or can be communicated over the network 104 to a remote application 108 hosted on another computer 102 via the lower layers of the framework described hereafter.

Referring again to FIG. 1, the OTP technique embodiments described herein operate in a layer 110/112 immediately beneath the applications 106/108 on each computer 100/102. Generally speaking, on one computer 100 the OTP technique embodiments 110 provide the local applications 106 hosted thereon with a variety of transport layer services which enable the local applications to communicate as necessary over the network 104 with remote applications 108 hosted on other computers 102. One of these transport layer services is a packet coding service which encodes original packets generated by the local applications 106 (which are destined for remote applications 108) into "output packets" which are suited for optimal transmission over the network 104. The packet coding service also decodes the original packets included within output packets which are received over the network 104 from remote applications 108 (and which are destined for the local applications 106) and delivers each decoded original packet to the appropriate local application 106. The packet coding service is described in more detail hereafter.

Referring again to FIG. 1, a suite of internetworking protocols 114/116 operates in a layer immediately beneath the OTP technique embodiments 110/112, and a suite of link protocols 118/120 operates in a layer immediately beneath the internetworking protocols on each computer 100/102. The internetworking protocols 114/116 and link protocols 118/120 together provide a variety of lower-level network communication services which facilitate the actual transmission of the output packets from their source computer, over the network's 104 underlying communication media 122/124 (including across network boundaries and through different interconnected networks and communication media as necessary) to their appropriate destination computer. Internetworking protocols 114/116, link protocols 118/120 and their related services are well known in the art of computer networking and need not be described in more detail here.

2.0 Packet Transmission Delays

As is appreciated in the art of computer networking and referring again to FIG. 1, the transmission of data packets from one computer 100 over the network 104 to another computer 102 can be delayed for a variety of reasons including, but not limited to, the following. The network 104 can be inherently "lossy" resulting in transmitted data packets either being lost in the network before they reach their destination, or being corrupted when they reach their destination. Consequently, the lost or corrupted data packets would have to be retransmitted over the network. Exemplary networks which are inherently lossy include, but are not limited to, wireless networks and networks comprising malfunctioning routers. The network 104 can also experience congestion due to bandwidth limitations in the network resulting in data packets having to be queued on the sending computer before an opportunity exists to transmit them over the network. Significant network congestion can also result in transmitted data packets being lost in the network due to factors such as router queue overruns and the like. These packet transmission delays are exacerbated in the situation where the data packets are generated by their source application 106/108 in a bursty manner.

As will be appreciated from the description which follows and referring again to FIG. 1, the OTP technique embodiments described herein generally serve to minimize the expected data packet transmission delays in the aforementioned situations where the network 104 is inherently lossy, the network experiences congestion, or an application 106/108 generates data packets in a bursty manner. The OTP technique embodiments further generally serve to minimize the expected data packet transmission delays in situations where the network 104 has a packet transmission delay which varies over time, or where the network has an inherently long path delay. The OTP technique embodiments also are advantageous in that they generally minimize data packet transmission delay when there is a large distance between the computers (e.g., when the computers reside on different continents, and the like). The OTP technique embodiments yet further generally serve to optimize the utilization of the network's currently available bandwidth (i.e. the network's transmission capacity) at each point in time.

3.0 Delay-Sensitive Applications

As is appreciated in the art of computer networking and referring again to FIG. 1, user-interactive applications 106/108 which operate together over a network 104, such as user-interactive client/server applications, can be delay-sensitive in that each user request for data on the client application (herein also referred to as a remote application) should be responded to as quickly as possible for optimal application performance. In other words, the requested data should be provided by the server application (herein also referred to as a local application) over the network with minimal delay. Additionally, such client applications generally require that the requested data be received over the network in order and in a lossless (i.e., reliable) manner. The OTP technique embodiments can be advantageously employed in these delay sensitive applications.

It is noted that the flow of data packets over the network for the aforementioned client/server applications can be quite bursty. In other words and generally speaking, based on a particular user request for data on the client application, the server application would generate a sequential burst of data packets which are subsequently transmitted over the network to the client application during a succession of transmission opportunities. There will typically then be one or more transmission opportunities during which no data packets are transmitted over the network to the client application since the client application is displaying the requested data to the user and the user is analyzing the displayed data. After the user has completed their analysis of the displayed data they may request additional data on the client application. In response to this follow-up user request the server application would generate another sequential burst of data packets which are subsequently transmitted over the network to the client application during another succession of transmission opportunities. After this follow-up transmission there would typically again be one or more transmission opportunities during which no data packets are transmitted over the network to the client application.

Referring again to FIG. 1, exemplary user-interactive applications which operate over a network, are delay-sensitive, and require an in order and lossless delivery of data, include conventional remote desktop client/server applications and the recently introduced class of cloud computing applications. Generally speaking, in the remote desktop applications a terminal server application 106 hosted on a first computer 100 provides one or more terminal sessions over the network. Within each terminal session a user working at a remote desktop client application 108 hosted on a second computer 102 can remotely request data from prescribed files and other prescribed applications residing on the first computer over the network 104. In the cloud computing applications a centralized data center application 106 hosted on a first computer 100 provides reliable data services via one or more client sessions over the Internet. Within each client session a user working at a remote client web browser application 108 hosted on a second computer 102 can remotely request prescribed data services from the centralized data center application 106 over the network 104.

4.0 Optimized Transport Protocol (OTP) for Delay-Sensitive Data

Generally speaking, the OTP technique embodiments described herein involve a method for transmitting original data packets from a local application hosted on a source computer over a network to a remote application hosted on a destination computer. As will be appreciated from the description which follows, this method minimizes the expected original data packet transmission delays caused by network congestion and packet loss in the network. This method also ensures that the original data packets are delivered to the remote application in order and in a lossless (i.e., reliable) manner. The OTP technique embodiments can be used to optimize the performance of user-interactive applications which operate together over a network and are delay-sensitive.

Although the OTP technique embodiments described herein are ideally suited to optimizing the performance of user-interactive applications which operate together over a network and are delay-sensitive as described heretofore, it is noted that the OTP technique embodiments are also fully compatible with any other type of application which operates over a network including those which are not user-interactive and hence are not particularly delay-sensitive.

The OTP technique embodiments described herein generally comprise two underlying features. The first feature is a packet transmission flow control strategy which minimizes transmission delays associated with transmitting original data packets generated by the local application over the network to the remote application based on the current state of the network. The transmission flow control strategy, which is described in more detail hereafter, minimizes network congestion and related original data packet transmission delays which can occur when the original data packets are transmitted over the network at a rate which exceeds the network's currently available bandwidth. Accordingly, the transmission flow control strategy also minimizes the round-trip time for transmitting each original data packet.

The second feature is a packet encoding strategy which dynamically decides for each output packet to be transmitted over the network at each transmission opportunity whether the output packet will be a forward error correction (FEC) packet or not. If it is decided that the output packet will be an FEC packet, the packet encoding strategy then dynamically decides which FEC packet to transmit. These decisions are based on the current state of the network and minimizing the expected time until each original data packet becomes useful to the remote application on the destination computer. The packet encoding strategy, which is also described in more detail hereafter, minimizes the expected original data packet transmission delays by minimizing the need for original data packet retransmission.

4.1 Encoder/Decoder Architecture

Figure 2:
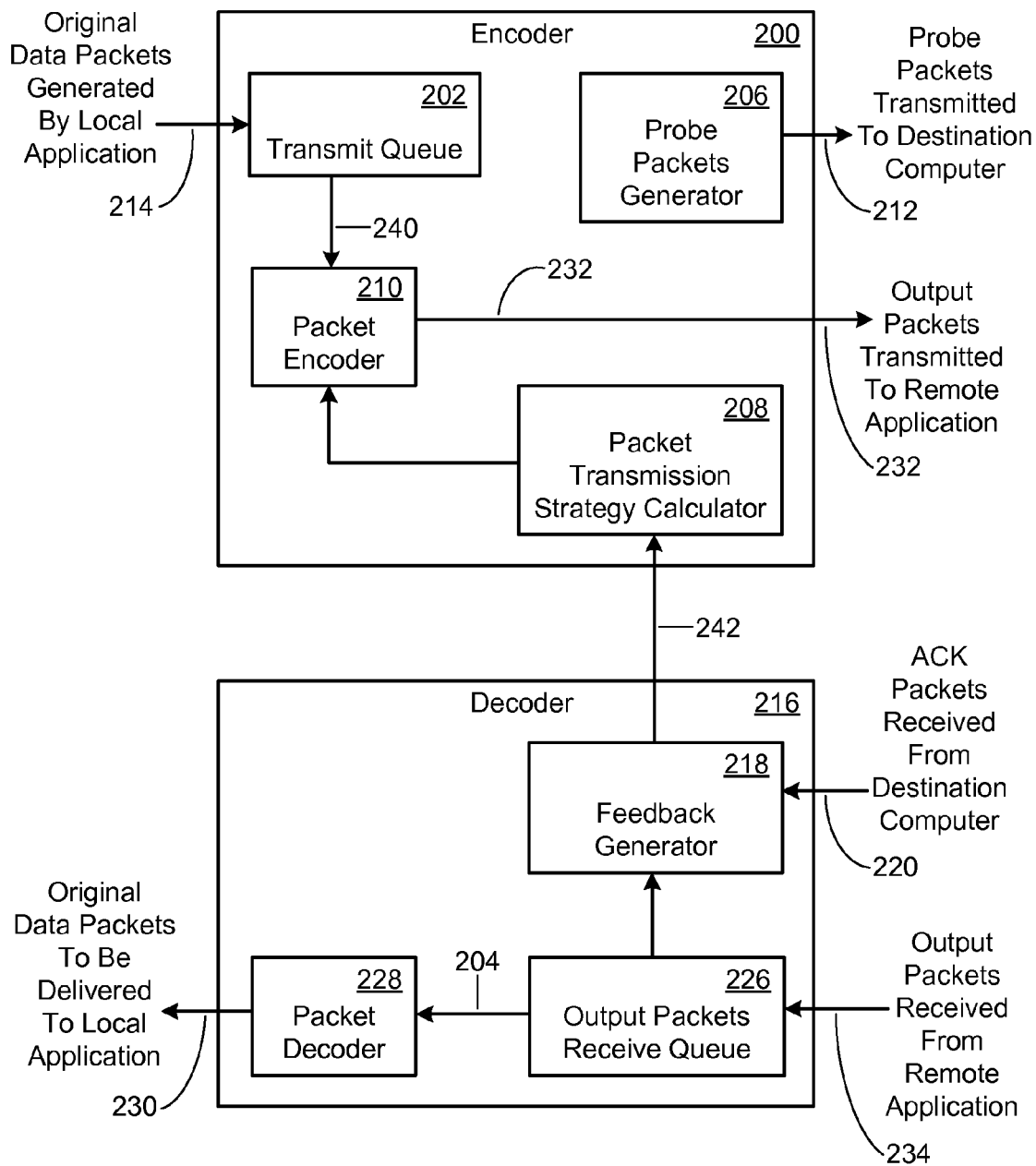
FIG. 2 is a diagram illustrating an exemplary embodiment, in simplified form, of an encoder/decoder architecture for the OTP technique embodiments.

FIG. 2 illustrates an exemplary embodiment, in simplified form, of an encoder/decoder architecture for the OTP technique embodiments described herein. Generally speaking and as exemplified in FIG. 2, original data packets generated by a local application 214 (which are destined for a remote application) are input to an encoder 200. Each input original packet 214 is temporarily stored in a transmit queue 202. Upon each transmission opportunity, a packet transmission strategy calculator 208 uses feedback 242 it receives from a decoder 216 to compute a variety of parameters representing the current state of the network. In one embodiment of the OTP technique these network state parameters comprised the network's currently available bandwidth, current packet loss rate, current packet transmission delay and current router queue size. The packet transmission strategy calculator 208 then uses these network state parameters to dynamically compute the aforementioned packet transmission flow control strategy and packet encoding strategy for the transmission opportunity. The packet transmission strategy calculator 208 also maintains a history of previous network states which can also be used in the computation of these strategies.

As will be described in more detail hereafter and referring again to FIG. 2, when a new communications session is established between the local application and the remote application, the network's currently available bandwidth is measured. In tested embodiments of the OTP technique described herein, the network's currently available bandwidth was proactively measured by transmitting a sequence of specialized, low overhead probe packets 212 (it is noted that these are not data packets) over the network to the destination computer, where these probe packets were generated by a probe packets generator 206. It is noted that alternate embodiments of the OTP technique are also possible where the network's currently available bandwidth is measured or estimated using other known methods.

Referring again to FIG. 2, once the packet encoding strategy has been calculated 208 for a given transmission opportunity, then based on this strategy the packet encoder 210 reads 240 one or more original packets from the transmit queue 202 and forms an output packet 232 from the original packets, where the output packet is subsequently transmitted over the network to the remote application. As will be described in more detail hereafter, based on the calculated packet encoding strategy the output packet 232 can be a single original packet or an FEC packet which is formed from a linear combination of a plurality of original packets.

Generally speaking and referring again to FIG. 2, output packets which are received over the network from the remote application 234 are input to the decoder 216. Each received output packet 234 is temporarily stored in an output packets receive queue 226. The received output packets are then read 204 from the output packets receive queue 226 in a first-in first-out manner and are input to a packet decoder 228. The packet decoder 228 attempts to decode each received output packet and extract the one or more original packets included therein. Original packets which are successfully extracted 230 are subsequently delivered to the local application.

Referring again to FIG. 2, when the destination computer successfully receives a particular output packet 232 which was transmitted over the network from the source computer, the destination computer transmits an acknowledgement (ACK) packet 220 over the network back to the source computer. This ACK packet 220 can specify a number of different things including, but not limited to, the following. The ACK packet 220 can specify that the particular output packet 232 was successfully received by the destination computer. The ACK packet 220 can also specify that the particular output packet 232 is considered lost since a later output packet 232 was successfully received by the destination computer. The ACK packet 220 can also specify if the particular output packet 232 was received out of order. ACK packets which are received over the network from the destination computer 220 are input to a feedback generator 218. The feedback generator 218 processes the ACK packets to routinely compute the aforementioned round-trip time and a one-way packet transmission delay indicator at a prescribed interval, where this delay indicator specifies if the one-way packet transmission delay is increasing, decreasing or unchanged. The feedback generator 218 maintains a history of computed round-trip times and delay indicators, and also routinely computes (at the prescribed interval) a median round-trip time over a prescribed congestion window. The feedback generator 218 provides the ACK packets, the computed round-trip times, the computed delay indicators, and the computed median round-trip times to the packet transmission strategy calculator 208 as part of the aforementioned feedback 242.

4.2 Packet Transmission Flow Control Strategy

This section describes exemplary embodiments of the packet transmission flow control strategy feature of the OTP technique. As described heretofore, this feature minimizes transmission delays associated with transmitting original data packets generated by the local application hosted on the source computer over the network to the remote application hosted on the destination computer based on the current state of the network.

Figure 3:
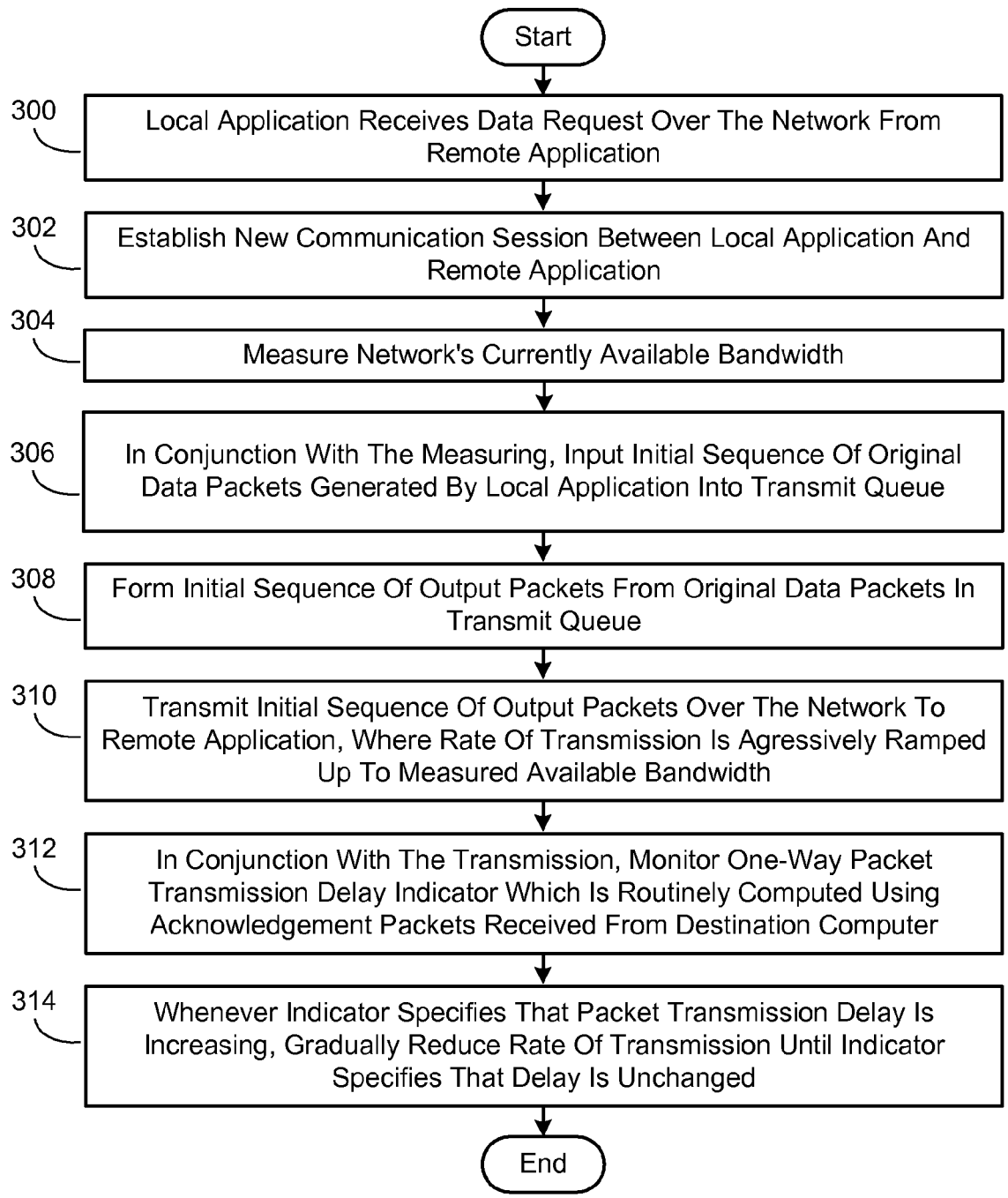
FIG. 3 is a flow diagram illustrating an exemplary embodiment, in simplified form, of a process for controlling the flow of an initial sequence of output packets being transmitted from a source computer to a destination computer.

FIG. 3 illustrates an exemplary embodiment, in simplified form, of a process for controlling the flow of an initial sequence of output packets being transmitted from the source computer to the destination computer. As exemplified in FIG. 3, the process starts in block 300 where the local application receives a data request over the network from the remote application. The source computer then establishes a new communication session between the local application and the remote application (block 302). The source computer then measures the network's currently available bandwidth (block 304). In conjunction with this bandwidth measurement, an initial sequence of original data packets which are generated by the local application in response to the data request (which are thus destined for the remote application) are input into the aforementioned transmit queue on the source computer (block 306). The aforementioned packet encoder on the source computer then forms an initial sequence of output packets from the original data packets in the transmit queue (block 308), where each output packet could be either an FEC packet or a single data packet based on a decision which is dynamically calculated at each transmission opportunity by the aforementioned packet transmission strategy calculator. This decision is based on the current state of the network and minimizing the expected time until each original data packet becomes useful to the remote application. The source computer then transmits the initial sequence of output packets over the network to the remote application during a succession of transmission opportunities, where the rate of output packet transmission is aggressively ramped up to the full amount of the measured available bandwidth (block 310).

The following is a description of an exemplary embodiment of how the rate of output packet transmission is aggressively ramped up to the full amount of the measured available bandwidth. Whenever the aforementioned one-way packet transmission delay indicator specifies that the one-way packet transmission delay is either decreasing or unchanged, and the aforementioned median round-trip time is less than or equal to the minimum round-trip time that has been computed by the feedback generator, the network is far from congestion and this situation is classified as "zone 1." Whenever the one-way packet transmission delay indicator specifies that the one-way packet transmission delay is either decreasing or unchanged, and the median round-trip time is greater than the minimum round-trip time, the network is approaching congestion and this situation is classified as "zone 2." Whenever the one-way packet transmission delay indicator specifies that the one-way packet transmission delay is increasing, the network is congested and this situation is classified as "zone 3." In the case of the zone 1 and zone 2 classifications, the rate of output packet transmission is increased by increasing the aforementioned congestion window using a conventional TCP-Illinois convex curve.

Referring again to FIG. 3, generally speaking and as is appreciated in the art of computer networking, given a particular level of network bandwidth, as the rate of output packet transmission approaches and/or exceeds this bandwidth, network congestion will start to occur and packets will start to build up in the transmit queue. This packet build-up results in an increase in the packet transmission delay. In order to obviate this situation, once the transmission of output packets to the remote application has begun (block 310), in conjunction with the transmission the source computer monitors the one-way packet transmission delay indicator (block 312). Whenever this indicator specifies that the packet transmission delay is increasing, the source computer gradually reduces the rate of output packet transmission until the indicator specifies that the delay is unchanged (block 314).

As described heretofore, the local application may generate its original data packets in a bursty manner so that after the initial sequence of output packets has been successfully transmitted over the network to the remote application, there will be an occurrence of one or more transmission opportunities during which no output packets are transmitted to the remote application (a situation which is referred to hereafter as a period of transmission inactivity). After such a period of transmission inactivity, the local application may receive another data request over the network from the remote application. In response to this request the local application would generate a subsequent sequence of original data packets which are destined for the remote application. This subsequent sequence of original data packets would be input into the transmit queue on the source computer, and the packets in this queue would then be formed into a subsequent sequence of output packets by the packet encoder on the source computer, where each output packet could again be either an FEC packet or a single data packet based on a decision which is dynamically calculated at each transmission opportunity by the aforementioned packet transmission strategy calculator. This decision is again based on the current state of the network and minimizing the expected time until each original data packet becomes useful to the remote application on the destination computer. This subsequent sequence of coded packets would be transmitted over the network to the remote application as follows.

Figure 4:
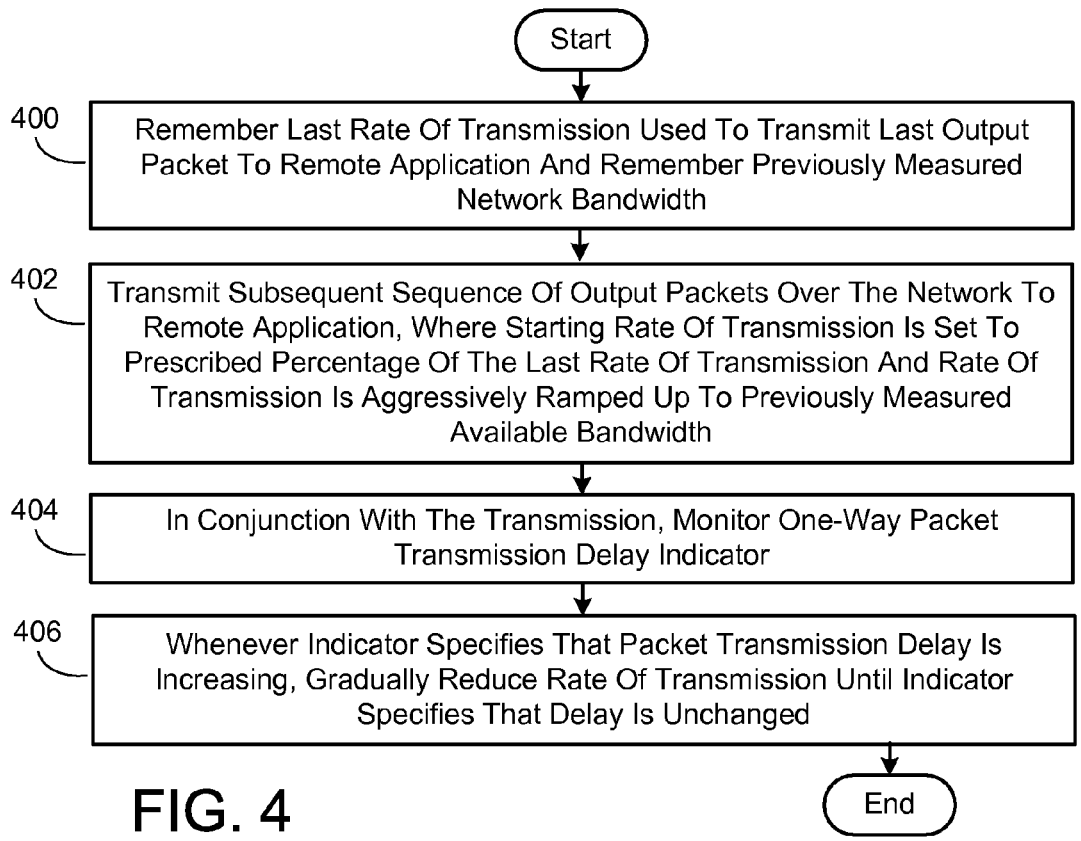
FIG. 4 is a flow diagram illustrating one exemplary embodiment, in simplified form, of a process for controlling the flow of a subsequent sequence of output packets being transmitted from the source computer to the destination computer after a period of transmission inactivity.

FIG. 4 is a flow diagram illustrating one exemplary embodiment, in simplified form, of a process for controlling the flow of the subsequent sequence of output packets being transmitted over the network after a period of transmission inactivity. As exemplified in FIG. 4, the process starts in block 400 where the source computer remembers the last rate of transmission used to transmit the last output packet to the remote application and remembers the previously measured network bandwidth. The source computer then transmits the subsequent sequence of output packets over the network to the remote application during another succession of transmission opportunities, where the starting rate of transmission is set to be a prescribed percentage of the aforementioned last rate of transmission and the rate of transmission is aggressively ramped up to the full amount of the previously measured available bandwidth (block 402). In conjunction with the transmission, the source computer monitors the one-way packet transmission delay indicator (block 404), and whenever this indicator specifies that the packet transmission delay is increasing, the source computer gradually reduces the rate of output packet transmission until the indicator specifies that the delay is unchanged (block 406).

Figure 5:
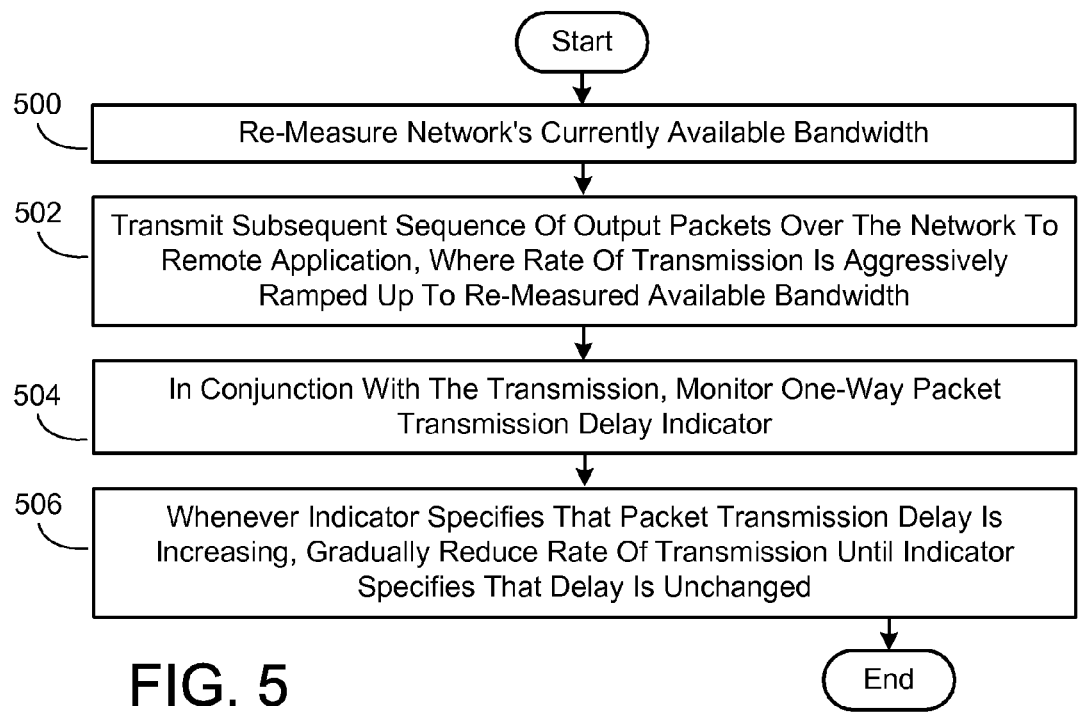
FIG. 5 is a flow diagram illustrating another exemplary embodiment, in simplified form, of a process for controlling the flow of a subsequent sequence of output packets being transmitted from the source computer to the destination computer after a period of transmission inactivity.

FIG. 5 is a flow diagram illustrating another exemplary embodiment, in simplified form, of a process for controlling the flow of the subsequent sequence of output packets being transmitted over the network after a period of transmission inactivity. As exemplified in FIG. 5 and referring again to FIG. 2, the process starts in block 500 where the source computer re-measures the network's currently available bandwidth. In tested embodiments of the OTP technique described herein, the network's currently available bandwidth was proactively re-measured by transmitting another sequence of specialized, low overhead probe packets 212 over the network to the destination computer, where these probe packets were generated by the probe packets generator 206. It is noted that alternate embodiments of the OTP technique are also possible where the network's currently available bandwidth is measured or estimated using other known methods. It is further noted that this re-measuring can occur either routinely at a prescribed interval, or upon the formation of the subsequent sequence of output packets. The source computer then transmits the subsequent sequence of output packets over the network to the remote application during another succession of transmission opportunities, where the rate of output packet transmission is aggressively ramped up to the full amount of the re-measured available bandwidth (block 502). In conjunction with the transmission, the source computer monitors the one-way packet transmission delay indicator (block 504), and whenever this indicator specifies that the packet transmission delay is increasing, the source computer gradually reduces the rate of output packet transmission until the indicator specifies that the delay is unchanged (block 506).

4.3 Packet Encoding Strategy

This section describes exemplary embodiments of the aforementioned packet encoding strategy feature. Generally speaking, this feature employs an adaptive FEC method where for each transmission opportunity the source computer dynamically decides for each output packet to be transmitted over the network, whether the output packet will be an FEC packet or a single original packet. If it is decided that the output packet will be an FEC packet, the packet encoding strategy then dynamically decides which FEC packet to transmit. As will be described in more detail hereafter, these decisions are based on minimizing the expected time until each original data packet becomes useful to the remote application on the destination computer, and take into consideration the current state of the network and the current transmission status of each original packet generated by the local application. Referring again to FIG. 2, it will be appreciated that the adaptive FEC method inherently prevents congestion in the transmit queue 202 of the encoder 200.

Referring again to FIG. 2, upon each transmission opportunity the source computer's packet transmission strategy calculator 208 groups the sequences of original packets generated by the local application 214 into the following four different sets, where the grouping is based on the current transmission status of each original packet 214. The first set comprises original packets 214 which have already been formed into output packets 232 by the packet encoder 210 and transmitted over the network to the destination computer at various transmission opportunities, and are definitively known to have been successfully received by the destination computer. The second set comprises original packets 214 which have already been formed into output packets 232 by the packet encoder 210 and transmitted over the network to the destination computer at various transmission opportunities, and are definitively known to have not been successfully received by the destination computer due to having been lost or corrupted during their transmission over the network. It is noted that the second set will typically be empty based on implementing the OTP technique embodiments described herein.

Referring again to FIG. 2, the third set comprises original packets 214 which have already been formed into output packets 232 by the packet encoder 210 and transmitted over the network to the destination computer at various transmission opportunities, but no definitive information is known regarding whether or not these original packets have been successfully received by the destination computer. Original packets 214 in this third set are assumed to still be "in flight." The fourth set comprises original packets 214 which have not yet been formed into output packets and transmitted over the network to the destination computer.

Generally speaking and referring again to FIG. 2, upon each transmission opportunity the source computer's packet transmission strategy calculator 208 uses the information it has regarding the current state of the network and the current transmission status of each original packet generated by the local application 214 (i.e., which if any original packets are in the first, second, third and fourth sets described heretofore) to dynamically decide how the next output packet to be transmitted over the network will be formed. This decision is generally made as follows. Whenever there are no original packets in the second set, third set or fourth set at the current transmission opportunity (i.e., all of the original packets generated by the local application have been successfully received by the remote application), the strategy calculator 208 simply instructs the packet encoder 210 to form no output packet (i.e., nothing would be transmitted at the current transmission opportunity). In the unlikely event that there are one or more original packets in the second set at the current transmission opportunity, the strategy calculator 208 can instruct the packet encoder 210 to form the next output packet from one particular original packet in the second set (i.e., the output packet transmitted at the current transmission opportunity would comprise a retransmission of a particular original packet which was lost during its previous transmission over the network).

Generally speaking and referring again to FIG. 2, whenever there are no original packets in the third set, but there are one or more original packets in the fourth set at the current transmission opportunity, the source computer's packet transmission strategy calculator 208 instructs the packet encoder 210 to form the next output packet from the next original packet in the fourth set. Whenever there are no original packets in the fourth set, but there are one or more original packets in the third set at the current transmission opportunity, the source computer's packet transmission strategy calculator 208 instructs the packet encoder 210 to form the next output packet as an FEC packet. Whenever there are one or more original packets in both the third and fourth sets at the current transmission opportunity, the strategy calculator 208 computes a first sum of expected packet transmission delays for the original packets in the third and fourth sets over a prescribed number N of succeeding transmission opportunities based on the assumption that the next output packet is formed as an FEC packet. The strategy calculator 208 also computes a second sum of expected packet transmission delays for the original packets in the third and fourth sets over the prescribed number N of succeeding transmission opportunities based on the assumption that the next output packet is formed from the next original packet in the fourth set. A mathematical notation and derivation for an exemplary embodiment of the sum of expected packet transmission delays is presented hereafter.

Referring again to FIG. 2, in one embodiment of the packet encoding strategy feature, after the aforementioned first and second sums have been computed, the strategy calculator 208 compares the first and second sums. Whenever the first sum is less than the second sum, the strategy calculator 208 instructs the packet encoder 210 to form the next output packet as an FEC packet. Whenever the first sum is equal to or great than the second sum, the strategy calculator 208 instructs the packet encoder 210 to form the next output packet from the next original packet in the fourth set.

Referring again to FIG. 2, in another embodiment of the packet encoding strategy feature, after the aforementioned first and second sums have been computed, the strategy calculator 208 computes a first probability of the first sum being smaller than a prescribed threshold. The strategy calculator 208 then computes a second probability of the second sum being smaller than the prescribed threshold. The strategy calculator 208 then compares the first and second probabilities. Whenever the first probability is greater than the second probability, the strategy calculator 208 instructs the packet encoder 210 to form the next output packet as an FEC packet. Whenever the first probability is equal to or less than the second probability, the strategy calculator 208 instructs the packet encoder 210 to form the next output packet from the next original packet in the fourth set.

It is noted that although transmitting an output packet comprising an FEC packet at the current transmission opportunity can reduce the transmission delay for original packets in the third set, this could have an effect of increasing the transmission delay for original packets in the fourth set. On the other hand, if an output packet comprising the next original packet in the fourth set is transmitted at the current transmission opportunity, this could have an effect of increasing the transmission delay for original packets in the third set. The strategy calculator weighs these two effects against each other based on the current content of the third and fourth sets and determines the optimal type of output packet to transmit over the network at each transmission opportunity in order to minimize the expected transmission delays due to packet loss and congestion in the network. It is noted that although the aforementioned aggressive ramp-up in the rate of transmission can result in the source computer transmitting output packets at a rate which overshoots the network's currently available bandwidth, and thus can result in an increase in the network's packet loss rate due to congestion in the network, the transmission of output packets comprising FEC packets can compensate for such packet loss. It is also noted that as the network's packet loss rate decreases due to a reduction of congestion in the network, the probability of the strategy calculator deciding that an output packet will be an FEC packet will generally also be reduced.

4.3.1 Mathematical Notation Definition

This section defines a mathematical notation for exemplary embodiments of the packet encoding strategy feature. The variable n denotes the current packet transmission opportunity (herein simply referred to as a "transmission opportunity"). The variable l indexes the succession of transmission opportunities and thus also indexes the output packets to be transmitted over the network to the remote application. The variable m indexes the original data packets generated by the local application. $\tau[l]$ denotes a particular point in time at which transmission opportunity l occurs. $\Delta[l]$ denotes the duration of time it takes for an output packet, which is transmitted from its source computer at transmission opportunity l, to travel over the network and reach its destination computer. $\in[l]$ denotes the packet loss rate of the network at transmission opportunity l. $Q[m]$ denotes the mth original packet generated by the local application. $T_m$ denotes the time until $Q[m]$ becomes useful to the remote application. T denotes a sum of expected times until a number M of original packets become useful to the remote application. $\gamma[m]$ denotes a particular point in time at which $Q[m]$ is generated and enters the transmit queue. $p_m^{(l)}$ denotes the probability of the destination computer being able to decode $Q[m]$ after transmission opportunity l.

$C[l]$ denotes the output packet which is transmitted over the network at transmission opportunity l. Generally speaking and as described heretofore, each output packet $C[l]$ comprises either one particular original packet in the aforementioned second set, the next original packet in the aforementioned fourth set, or an FEC packet made up of a linear combination of the original packets in the aforementioned third set. More particularly, $C[l]$ can be given by the following equation:

$$C[l] = \sum_{m=b[l]}^{e[l]} \alpha_l[m]Q[m] \qquad (1)$$
$$= \alpha_l^T Q_l,$$

where the linear combination is over a prescribed Galois field, $b[l]$ denotes a prescribed beginning original packet used in the linear combination (e.g., $b[l]$ can be the first original packet in the aforementioned third set), e[l] denotes a prescribed ending original packet used in the linear combination (hereafter also referred to as an "ending position"—e.g., e[l] can be the last original packet in the third set), $\alpha_l[m]$ denotes an mth coding coefficient, $\alpha_l$ is a vector of coding coefficients, $Q_l$ is a vector of all the original packets used in the linear combination. In the situation where C[l] comprises one particular original packet, then b[l]=e[l] and $\alpha_l$=1.

$Q_1$ denotes the aforementioned first set of original packets (i.e., those which have already been formed into output packets and transmitted over the network to the destination computer, and are definitively known to have been successfully received by the destination computer). Correspondingly, $Q_1^{(n)}$ denotes this first set at the current transmission opportunity n. $Q_2$ denotes the aforementioned second set of original packets (i.e., those which have already been formed into output packets and transmitted over the network to the destination computer, and are definitively known to have not been successfully received by the destination computer due to having been lost during their transmission over the network). Correspondingly, $Q_2^{(n)}$ denotes this second set at the current transmission opportunity n. $Q_3$ denotes the aforementioned third set of original packets (i.e., those which have already been formed into output packets and transmitted over the network to the destination computer, and are assumed to still be in flight). Correspondingly, $Q_3^{(n)}$ denotes this third set at the current transmission opportunity n. $Q_4$ denotes the aforementioned fourth set of original packets (i.e., those which have not yet been formed into output packets and transmitted over the network to the destination computer). Correspondingly, $Q_4^{(n)}$ denotes this fourth set at the current transmission opportunity n. As will be appreciated from the more detailed description of the packet encoding strategy feature embodiment which follows and referring again to FIG. 2, the composition of original packets in sets $Q_1$, $Q_2$, $Q_3$ and $Q_4$ changes over time as the encoder 200 receives feedback 242 from the decoder 216 and as timeouts occur.

B[n] denotes the index of the first original packet which is not in $Q_1$ prior to transmission opportunity n. In other words, $Q[B[n]-1] \in Q_1^{(n)}$ and $Q[B[n]] \notin Q_1^{(n)}$. E[n] denotes the index of the last original packet in $Q_4$ prior to transmission opportunity n. L[n] is the number of original packets in $Q_4$ prior to transmission opportunity n. In other words, L[n]=E[n]−B[n]+1. $Q_m^{(n)}$ denotes a vector of original packets prior to transmission opportunity n, where $Q_m^{(n)}$ is defined by the following equation:

$$Q_m^{(n)} = [Q[B[n]], Q[B[n]+1], \ldots, Q[B[n]+m]]^T \text{ for } m=0, 1, \ldots, L[n]-1. \quad (2)$$

For each output packet C[l] transmitted from the source computer prior to transmission opportunity n which has $e[l] \geq B[n]$, a $D_A[l]=e[l]-B[n]+1$ dimensional vector $A_{l,n}$ can be given by the following equation:

$$A_{l,n} = [A_{l,n}[0], A_{l,n}[1], \ldots, A_{l,n}[D[l]-1]]^T, \quad (3)$$

where, $$A_{l,n}[k] = \begin{cases} \alpha_l[k+B[n]], & \text{if } k+B[n] \geq b[l] \\ 0, & \text{else}, \end{cases} \quad (4)$$

and $1 \leq D[l] \leq L[n]$.

For each output packet C[l] transmitted from the source computer prior to transmission opportunity n which has $e[l] \geq B[n]$, for each m=[e[l],e[l]+1, \ldots, E[n]] a $D_B[n]=$ i−B[n]+1 dimensional vector $B_{l,n,m}$ can be given by the following equation:

$$B_{l,n,m} = [B_{l,n,m}[0], B_{l,n,m}[1], \ldots, B_{l,n,m}[D[l]-1]]^T, \quad (5)$$

where, $$B_{l,n,m}[k] = \begin{cases} \alpha_l[k+B[n]], & \text{if } e[l] \geq k+B[n] \geq b[l] \\ 0, & \text{else}. \end{cases} \quad (6)$$

It is noted that $B_{l,n,m}$ will have at least one non-zero component.

The set of output packets which have corresponding (m+1) dimensional vectors $A_{l,n}$ prior to transmission opportunity n can be denoted as $C_m^{(n)}$, which can be given by the equation $C_m^{(n)} = \{C[l]: e[l]=B[n]+m\}$. It is noted that there are L[n] different sets $C_m^{(n)}$, where m=[0, \ldots, L[n]-1]. It is further noted that these different sets are mutually exclusive and the union of these different sets $C_m^{(n)}$ is the set of all output packets having $e[l] \geq B[n]$.

$R_m^{(n)}$ denotes a subset of the set of output packets $C_m^{(n)}$ that have actually been received by their destination computer. $R_m^{(n)}$ is a random variable which denotes the number of output packets having linearly independent (m+1) dimensional vectors $A_{l,n}$ which have been processed by the destination computer's decoder prior to transmission opportunity n, where m=[0, 1, \ldots, L[n]-1]. It is thus evident that $0 \leq R_m^{(n)} \leq m+1$.

The set of output packets which have corresponding (m+1) dimensional vectors $B_{l,n,m}$ prior to transmission opportunity n can be denoted as $D_m^{(n)}$, which can be given by the equations $D_m^{(n)} = \{C[l]: B[n] \leq e[l] \leq B[n]+m\}$, or $D_m^{(n)} = \cup_{i=0}^{m} C_i^{(n)}$. $V_m^{(n)}$ denotes a subset of the set of output packets $D_m^{(n)}$ which have actually been processed by the destination computer's decoder. $V_m^{(n)}$ is a random variable which denotes the number of output packets which have linearly independent (m+1) dimensional vectors $B_{l,n,m}$ which have been processed by the destination computer's decoder prior to transmission opportunity n. It is thus evident that $0 \leq V_m^{(n)} \leq m+1$.

Generally speaking and as is appreciated in the art of probability theory, P(A) denotes the probability of event A. Accordingly, $P(A \cap B)$ denotes the probability of A and B, $P(A \cup B)$ denotes the probability of A or B, and P(A|B) denotes the conditional probability of A given B.

$I_m^{(n)}$ denotes an indicator variable which indicates whether all received output packets up to index (m+B[n]) are decodable. Accordingly, the probability of all received output packets up to index (m+B[n]) being decodable can be given by the equation $P(I_m^{(n)}=1)=p_m^{(n)}$.

4.3.2 Mathematical Derivations

This section presents mathematical derivations for two exemplary embodiments of the packet encoding strategy feature. The mathematical derivations are based on the following assumptions. First, it is assumed that all original data packets generated by the local application (which are destined for the remote application) are of equal size. Second, since it is known that transmitting packets over a network at a rate which is larger than the network's currently available bandwidth on an ongoing basis can result in the packet transmission delays becoming increasingly larger due to congestion in the network, it is assumed herein that the transmission opportunities are provided to the source computer at a rate which matches the network's currently available bandwidth. For example, suppose that the network's currently available bandwidth is 500 kilobits/second and the size of each original packet is 8 kilobits, then a transmission opportunity will be provided to the source computer every 16 milliseconds.

The derivations presented hereafter are further based on the following assumptions as to the optimality of the output packets. First, given the aforementioned set of vectors $A_{l,n}$ corresponding to the set of output packets $C_m^{(n)}$, it can be assumed that any subset of (m+1) vectors in $A_{l,n}$ spans an (m+1) dimensional vector space over the aforementioned Galois field. Thus, the aforementioned random variable $R_m^{(n)}$ can be given by the equation $R_m^{(n)} = \min(m+1, |R_m^{(n)}|)$. In other words, $R_m^{(n)}$ is the minimum of the cardinality of the aforementioned set of received output packets $R_m^{(n)}$ and (m+1). $R_m^{(n)}$ can also be given by the equation $R_m^{(n)} = \min(m+1, F_m^{(n)} + \min(1, U_m^{(n)}))$, where $F_m^{(n)}$ denotes the number of FEC packets received with ending position e[l]=m+1, and $U_m^{(n)}$ denotes the number of original packets received for packet (m+1). Second, given any aforementioned $V_m^{(n)}$ linearly independent vectors $B_{l,n,m}$ corresponding to output packets which have been received by their destination computer (i.e., the set $V_m^{(n)}$), and given the corresponding vectors $B_{l,n,m+1}$ and any $(m+1+V_m^{(n)})$ vectors from the set of received vectors $R_{m+1}^{(n)}$ (assuming that the cardinality of this set is sufficient), it can be assumed that these vectors span the (m+1+1) dimensional vector space over the Galois field. Thus, $V_{m+1}^{(n)}$ can be given by the equation:

$$V_{m+1}^{(n)} = \min(m+1+1, V_m^{(n)} + R_{m+1}^{(n)}). \tag{7}$$

This basically means that all linearly independent output packets C[l] having an ending position e[l] use coding coefficients such that the aforementioned vector of coding coefficients $\alpha_l$ is linearly independent from the subspace spanned by this vector of coding coefficients for all previously coded vectors.

As will be understood from the description which follows, a given output packet received by a destination computer is decodable only if all previously received output packets have been successfully decoded. Thus, the expected time until Q[m] becomes useful to the remote application can be given by the following equation:

$$E(T_m) = \sum_{\delta \in T_m} \delta P(T_m = \delta) \tag{8}$$

$$= \sum_{l=0}^{\infty} (\tau[l] + \Delta[l] - \gamma[m]) P(I_m^{(l-1)} = 0 \cap I_m^{(l)} = 1)$$

$$= \sum_{l=0}^{\infty} (\tau[l] + \Delta[l] - \gamma[m]) P(I_m^{(l-1)} = 0)$$

$$P(I_m^{(l)} = 1 \mid I_m^{(l-1)} = 0).$$

It is known that:

$$P(I_m^{(l)} = 1) = P(I_m^{(l-1)} = 0) P(I_m^{(l)} = 1 \mid I_m^{(l-1)} = 0) + \tag{9}$$
$$P(I_m^{(l-1)} = 1) P(I_m^{(l)} = 1 \mid I_m^{(l-1)} = 1),$$

$$p_m^{(l)} = (1 - p_m^{(l-1)}) P(I_m^{(l)} = 1 \mid I_m^{(l-1)} = 0) + p_m^{(l-1)}(1), \text{ and} \tag{10}$$

$$P(I_m^{(l)} = 1 \mid I_m^{(l-1)} = 0) = \frac{p_m^{(l)} - p_m^{(l-1)}}{1 - p_m^{(l-1)}}. \tag{11}$$

Therefore:

$$P(T_m = \tau[l] + \Delta[l] - \gamma[m]) = (1 - p_m^{(l-1)}) \frac{p_m^{(l)} - p_m^{(l-1)}}{1 - p_m^{(l-1)}} \tag{12}$$

$$= p_m^{(l)} - p_m^{(l-1)}.$$

Thus, the sum of expected times until a number M of original packets become useful to the remote application T can be given by the following equation:

$$T = \sum_{m=0}^{M-1} \sum_{l=0}^{\infty} (\tau[l] + \Delta[l] - \gamma[m])(p_m^{(l)} - p_m^{(l-1)}), \tag{13}$$

where the variable M denotes the combined total number of original packets in the third and fourth sets.

The packet encoding strategy feature embodiment described herein computes the optimal way to form the output packets (which affects $p_m^{(l)}$) at each transmission opportunity n in order to minimize T. It is noted that in the situation where the source computer is transmitting the output packets over the network at a rate which exceeds the network's currently available bandwidth, a penalty factor can be added to $\Delta(l)$ that makes $\Delta(l)$ larger, thus reducing the probability of the next output packet being formed as an FEC packet. This serves to reduce network bandwidth utilization in these situations.

The computation of equation (13) can be simplified in the following manner. For each transmission opportunity n, rather than computing T over an infinite number of transmission opportunities, T can be computed over only a prescribed number N of succeeding transmission opportunities. Thus, the following is a simplified version of equation (13):

$$T = \sum_{m=0}^{M-1} \sum_{l=0}^{N} (\tau[l] + \Delta[l] - \gamma[m])(p_m^{(l)} - p_m^{(l-1)}). \tag{14}$$

In the situation where the computation of equation (14) requires a level of computing resources which exceed those which are available on the source computer, this computation can be further simplified by only considering the most significant terms for each m. In other words, for original packets which are in $Q_3$ and thus have a non-zero probability of being decodable, only the effect of the current transmission on the probability of these original packets being decodable can be considered. For original packets which are in $Q_4$, how long the probability of these original packets being decodable stays zero can be considered. For the current transmission opportunity, only the original packets which are affected by the current transmission opportunity (i.e., only the original packets which are currently in the transmit queue and the original packets which currently have a non-one probability of being decodable) can be considered. Based on these simplifications T can be given by the following equation:

$$T = \sum_{m=0}^{M-1} \sum_{l=n}^{N} (\tau[l] + \Delta[l] - \gamma[m])(p_m^{(l)} - p_m^{(l-1)}). \tag{15}$$

Assuming that the time difference between successive transmission opportunities is a constant and can be given by the equation $\delta = \tau[l+1] - \tau[l]$, and assuming that the time for a output packet to be transmitted from the source computer to the destination computer is also a constant (i.e., assuming that there is no network congestion due to the transmission rate being close to the network's currently available bandwidth) and thus $\Delta[l] = \Delta$, equation (15) can be rewritten as follows:

$$T = \sum_{m=B[n]}^{E[n]} \left[ (1 - p_m^{(l-1)})(\tau[l-1] + \Delta - \gamma[m]) + \sum_{l=n}^{N} (-p_m^{(l)})\delta \right] + \sum_{m=E[n]+1}^{G[n]} \left[ (\tau[f_m] + \Delta - \gamma[m]) + \sum_{l=n}^{N} (1 - p_m^{(l)})\delta \right], \quad (16)$$

where $G[n]$ is the last original packet in the transmit queue until the transmit queue is cleared, $f_m$ is the first transmission opportunity that occurs after original packet m enters the transmit queue, and original packets up to $E[n]$ have already entered the transmit queue. It is noted that many of the terms in equation (16) are constant and thus are unaffected by the packet encoding strategy. Thus, equation (16) can be simplified as follows:

$$T' = \sum_{m=B[n]}^{G[n]} \sum_{l=n}^{N} (1 - p_m^{(l)}). \quad (17)$$

By dividing the original packets which are currently in the transmit queue into those which are in $Q_3$ and those which are in $Q_4$, denoting $D[n]$ to be the index of the most recently transmitted original packet in $Q_3$, and simply considering the most significant terms as described heretofore, equation (17) can be expressed as follows:

$$T' \approx \sum_{m=B[n]}^{D[n]} (1 - p_m^{(n)}) + \sum_{m=D[n]+1}^{E[n]} \sum_{l=n}^{n+Q_m-1} 1 + \sum_{m=E[n]+1}^{G[n]} \sum_{l=f_m}^{f_m+Q_m-1} 1, \quad (18)$$

where $(Q_m+1)$ is the first time that original packet m is transmitted and therefore corresponds to the queuing delay that original packet m experiences in the transmit queue.

In the case where an FEC packet is transmitted, $D[n]$ will not change. Thus, the expected time until the FEC packet become useful to the remote application can be given by the following equation:

$$T_F = \sum_{m=B[n]}^{D[n]} (1 - p_m^{(n)}) + \sum_{m=D[n]+1}^{G[n]} Q_m. \quad (19)$$

where $$Q_m = \frac{C_F + (m - D[n] - 1)}{1 - \varepsilon}$$

and $C_F$ denotes an expected number of original packets which are missing at the destination computer and which are needed by the packet decoder to decode up to $D[n]$. It is noted that $C_F$ can be computed using the probability calculations presented heretofore.

Similarly, in the case where an original packet is transmitted, the expected time until the original packet become useful to the remote application can be given by the following equation:

$$T_O = \sum_{m=B[n]}^{D[n]+1} (1 - p_m^{(n)}) + \sum_{m=D[n]+2}^{G[n]} Q_m, \quad (20)$$

where $$Q_m = \frac{C_O + (m - D[n] - 2)}{1 - \varepsilon}$$

and $C_O$ denotes an expected number of original packets which are missing at the destination computer and which are needed by the packet decoder to decode up to $(D[n]+1)$.

By removing common terms from equation (19), this equation can be rewritten as follows:

$$T'_F = \sum_{m=B[n]}^{D[n]} (1 - p_m^{(n)}) + \frac{C_F(G[n] - D[n]) + (G[n] - D[n] - 1)}{1 - \varepsilon}. \quad (21)$$

The term $(G[n] - D[n] - 1)$ in equation (21) can be considered to be a penalty for increasing the queuing delay experienced by original packets in the transmit queue which are waiting to be transmitted; this term makes equation (21) congestion-aware. By removing common terms from equation (20), this equation can be rewritten as follows:

$$T'_O = \sum_{m=B[n]}^{D[n]+1} (1 - p_m^{(n)}) + \frac{C_O(G[n] - D[n] - 1)}{1 - \varepsilon}. \quad (22)$$

4.3.3 Computation of Probabilities

This section describes the computation of the aforementioned probability $p_m^{(l)}$ at the particular instant in time $l=n$. It is noted that the superscript (n) is dropped from all of the variables in this section in order to enhance readability. It is understood that all of the variables in this section are a function of transmission opportunity n.

By conditioning the probability $p_m$ on the values which the aforementioned random variable $V_m$ can take, $p_m$ can be given by the following equation:

$$p_m = \sum_{\upsilon=0}^{m+1} P(V_m = \upsilon) P(I_m = 1 \mid V_m = \upsilon). \quad (23)$$

By using recursion, $p_m$ can also be given by the following equation:

$$P(I_m = 1) = P(I_{m+1} = 1) P(I_m = 1 \mid I_{m+1} = 1) + \quad (24)$$
$$P(I_{m+1} = 0) P(I_m = 1 \mid I_{m+1} = 0)$$
$$= p_{m+1} + P(I_m = 1 \cap I_{m+1} = 0).$$

Although equation (24) is mathematically more complicated than equation (23), equation (24) is simpler from a computational perspective. In order to compute $P(I_m=1 \cap I_{m+1}=0)$, this can first be rewritten as follows:

$$P(I_m = 1 \cap I_{m+1} = 0) = P(V_m = m+1 \cap I_{m+1} = 0) \quad (25)$$

$$= P(V_m = m+1)$$
$$P(I_{m+1} = 0 \mid V_m = m+1)$$
$$= P(V_m = m+1)[P(R_{m+1} = 0)$$
$$P(I_{m+1} = 0 \mid V_m = m+1, R_{m+1} = 0) +$$
$$P(R_{m+1} \geq 0)P(I_{m+1} = 0 \mid V_m = m+1,$$
$$R_{m+1} \geq 0)]$$
$$= P(V_m = m+1)P(R_{m+1} = 0)$$
$$P(I_{m+1} = 0 \mid V_m = m+1, R_{m+1} = 0)$$
$$= P(V_m = m+1)P(R_{m+1} = 0)$$
$$(1 - P(I_{m+1} = 1 \mid V_{m+1} = m+1)).$$

Thus, based on equation (25), $p_m$ can also be given by the following equation:

$$p_m = p_{m+1} + P(V_m = m+1)P(R_{m+1} = 0)(1 - P(I_{m+1} = 1 \mid V_{m+1} = m+1)). \quad (26)$$

In order to compute $p_m$ using either equation (23) or equation (26), one can compute $P(V_m = \upsilon)$, $P(R_m = r)$ and $P(I_m = 1 \mid V_m = \upsilon)$, where both r and $\upsilon$ are between zero and $(m+1)$. $P(I_m = 1 \mid V_m = \upsilon)$ can be given by the following equation:

$$P(I_m = 1 \mid V_m = \upsilon) = \begin{cases} 1, & \text{if } \upsilon = m+1 \\ P(I_{m+1} = 1 \mid V_m = \upsilon), & \text{if } \upsilon < m+1. \end{cases} \quad (27)$$

By conditioning on $R_{m+1}$, $P(I_{m+1}=1 \mid V_m = \upsilon)$ can be computed as follows:

$$P(I_{m+1} = 1 \mid V_m = \upsilon) = \sum_{r=0}^{m+1+1} P(R_{m+1} = r) \quad (28)$$
$$P(I_{m+1} = 1 \mid V_m = \upsilon, R_{m+1} = r)$$
$$= \sum_{r=0}^{m+1+1} P(R_{m+1} = r)$$
$$P(I_{m+1} = 1 \mid V_{m+1} = \min(\upsilon + r, m+1+1)).$$

Equation (28) can be computed using recursion if $P(R_m = r)$ is known. By again conditioning on $R_m$, $P(V_m = \upsilon)$ can be computed as follows:

$$P(V_m = \upsilon) = P(\min(V_{m-1} + R_m, m+1) = \upsilon) \quad (29)$$
$$= \sum_{r=0}^{m+1} P(R_m = r)$$
$$P(\min(V_{m-1}, m+1-r) = \upsilon - r \mid R_m = r)$$
$$= \sum_{r=\max(0, \upsilon+1-m)}^{\min(m+1, \upsilon)} P(R_m = r)$$
$$P(\min(V_{m-1}, m-r) = \upsilon - r).$$

The final simplification in equation (29) is due to the fact that $V_{m-1}$ is independent of $R_m$, and the fact that $P(V_{m-1})$ is only non-zero for $0 \leq \upsilon - r \leq m$ which implies $\upsilon \geq r \geq \upsilon - m$. $P(\min(V_{m-1}, m-r) = \upsilon - r)$ can be given by the following equation:

$$P(\min(V_{m-1}, m-r) = \upsilon - r) = \begin{cases} P(V_{m-1} = \upsilon - r), & \text{if } \upsilon < m \\ \sum_{k=\upsilon-r}^{m} P(V_{m-1} = k), & \text{if } \upsilon = m. \end{cases} \quad (30)$$

Equation (30) can be computed using recursion if $P(R_m)$ is known.

In order to compute $P(R_m = r)$, one can look at the set of output packets $C_m$ which have an ending position $e[l] = B[n] + m$. It can be assumed that different output packets can have a potentially different probability of having been successfully received at the destination computer. This can be due to either changes in the packet loss rate of the network, or the encoder getting feedback from the decoder as to which output packets have been successfully received (these coded packets will have a probability equal to one) and which output packets have been lost (these will have a probability equal to zero). It can further be assumed that the subset of output packets $R_m$ which have actually been received by the destination computer can be divided into K different subsets $S_{m,k}$, where each subset $S_{m,k}$ has $\beta[k]$ elements and a network loss rate $\varepsilon[k]$. It can yet further be assumed that $S_{m,k} \in [0, 1, \ldots, \beta[k]]$ is a random variable representing the number of received output packets in the set $S_{m,k}$. Then, based on the assumption that any set of less than or equal to m+1 vectors of coding coefficients $\alpha_l$ are linearly independent, $P(R_m = r)$ can be given by the equation:

$$P(R_m = r) = \begin{cases} P\left(\sum_{k=0}^{K-1} S_{m,k} = r\right), & \text{if } r < m+1 \\ P\left(\sum_{k=0}^{K-1} S_{m,k} \geq r\right), & \text{if } r = m+1. \end{cases} \quad (31)$$

Equation (31) can be recursively computed using the methods described heretofore. A random variable $W_{m,k}$ can be defined which represents the cumulative sum of linearly independent packets, where $W_{m,k} = \min(\Sigma_{j=0}^{k} S_{m,j}, m+1)$. Then it can been seen that $R_m = W_{m,K-1}$. $P(W_{m,k} = r)$ can be given by the following equation:

$$P(W_{m,k} = r) = \sum_{j=0}^{\beta[k]} P(S_{m,k} = j)P(W_{m,k-1} = r - j) \quad (32)$$
$$= \sum_{j=\max(0, r-m-1)}^{\min(\beta[k], r)} P(S_{m,k} = j)P(W_{m,k-1} = r - j),$$

since $0 \leq r - j \leq m+1$ which results in $r \geq j \geq r-m-1$. $P(S_{m,k} = j)$ can be computed via the following equation:

$$P(S_{m,k} = j) = \binom{\beta[k]}{j}(\varepsilon[k])^{\beta[k]-j}(1 - \varepsilon[k])^j. \quad (33)$$

It can be seen that the complexity of computing $P(R_m = r)$ is at most $O(m^2)$, however, it is typically much less than this. By way of example but not limitation, if only M output packets are transmitted over the network with e[l]=m+B[n] (which is usually much less than m+1), and if these transmitted output packets are divided into only S sets of received probabilities, it can be seen that the complexity of computing $P(R_m=r)$ is only $M(0)+M(1)+\ldots+M(S-1)$, where $M(i)$ denotes the number of packets in each set. Typically at most $(1+\in)$ output packets will be transmitted over the network with an ending position e[l], where $\in$ denotes the network loss rate. Therefore, it can be said that the complexity of computing $P(R_m=r)$ is typically O(1).

Computing $P(I_{m+1}=1|V_m=\upsilon)$ and $P(V_m=\upsilon)$ requires $m(m+1)/2$ operations which have a complexity of $O(m^2)$. Since the summation in equation (29) typically takes place packet by packet basis, it can be seen that adding another packet only changes $P(R_m=r)$ for some value $m=m_0$. By looking at this summation it can be seen that $P(V_m=\upsilon)$ only changes for $m \geq m_0$ and $P(I_{m+1}=1|V_m=\upsilon)$ only changes for $m \leq m_0$. These facts can be used to reduce the computational complexity of $P(I_{m+1}=1|V_m=\upsilon)$ and $P(V_m=\upsilon)$. Additionally, it is noted that since these computations are recursive, once there is little change in the computed probability for a recursion associated with a particular value of m, it is not necessary to compute the recursions for subsequent values of m. Although stopping the recursions in this manner can result in drift, the drift can be compensated for by periodically refreshing all the probabilities.

5.0 Additional Embodiments

While the OTP technique has been described in more detail by specific reference to embodiments thereof, it is understood that variations and modifications thereof can be made without departing from the true spirit and scope of the OTP technique. It is also noted that any or all of the aforementioned embodiments can be used in any combination desired to form additional hybrid embodiments. Although the OTP technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

6.0 Computing Environment

This section provides a brief, general description of a suitable computing system environment in which portions of the OTP technique embodiments described herein can be implemented. These OTP technique embodiments are operational with numerous general purpose or special purpose computing system environments or configurations. Exemplary well known computing systems, environments, and/or configurations, that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 6:
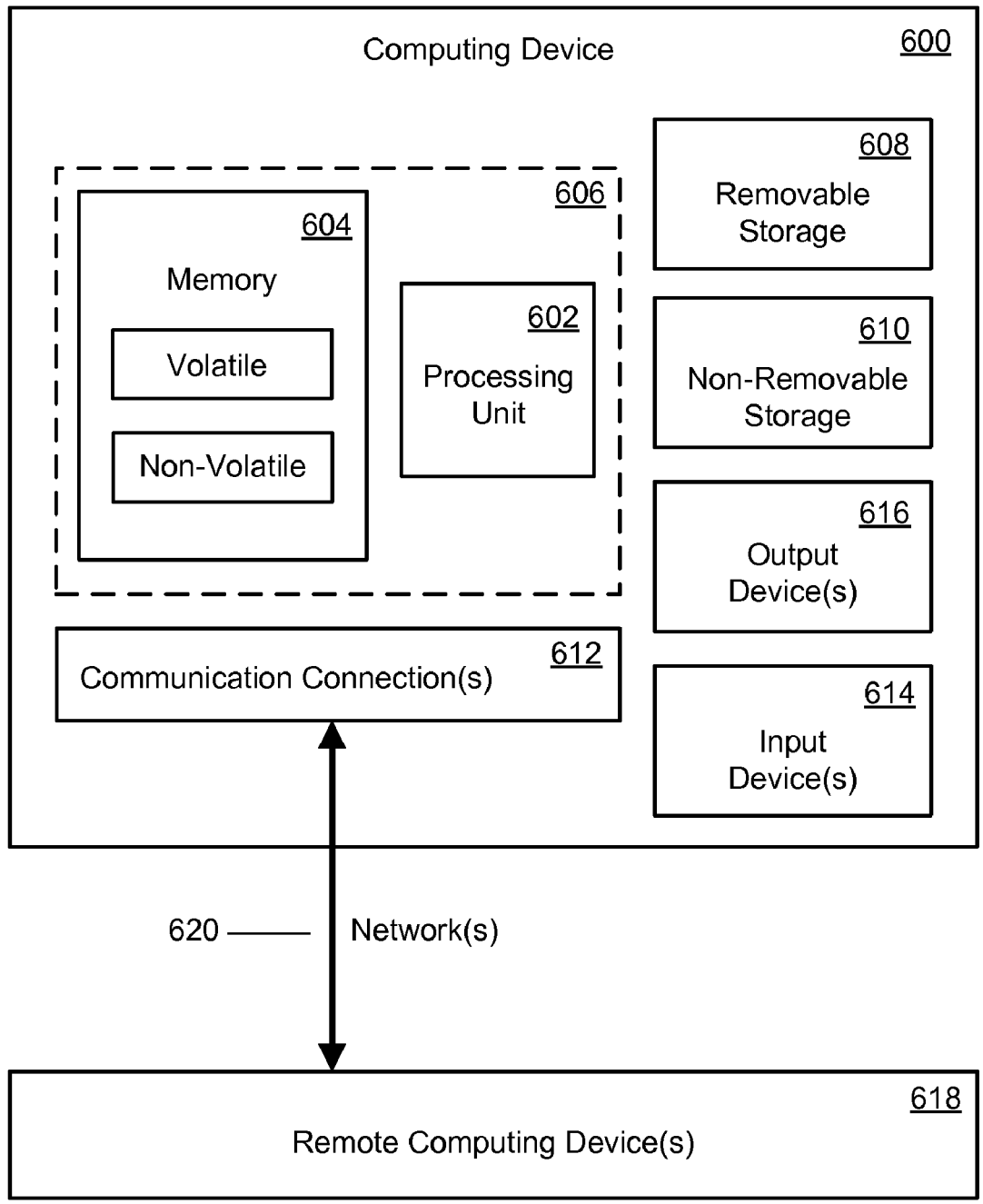
FIG. 6 is a diagram illustrating an exemplary embodiment, in simplified form, of a general purpose, network-based computing device which constitutes an exemplary system for implementing portions of the OTP technique embodiments described herein.

FIG. 6 illustrates an exemplary embodiment, in simplified form, of a suitable computing system environment according to the OTP technique embodiments described herein. The environment illustrated in FIG. 6 is only one example of a suitable computing system environment and is not intended to suggest any limitation as to the scope of use or functionality of the OTP technique embodiments described herein. Neither should the computing system environment be interpreted as having any dependency or requirement relating to any one or combination of components exemplified in FIG. 6.

As exemplified in FIG. 6, an exemplary system for implementing portions of the OTP technique embodiments described herein includes one or more computing devices, such as computing device 600. In its simplest configuration, computing device 600 typically includes at least one processing unit 602 and memory 604. Depending on the specific configuration and type of computing device, the memory 604 can be volatile (such as RAM), non-volatile (such as ROM and flash memory, among others) or some combination of the two. This simplest configuration is illustrated by dashed line 606.

As exemplified in FIG. 6, computing device 600 can also have additional features and functionality. By way of example, computing device 600 can include additional storage such as removable storage 608 and/or non-removable storage 610. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 600 such as computer readable instructions associated with an operating system, application programs and other program modules, and data structures, among other things. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 600. Any such computer storage media can be part of computing device 600.

As exemplified in FIG. 6, computing device 600 also includes a communications connection(s) 612 that allows the device to operate in a networked environment and communicate with a remote computing device(s), such as remote computing device(s) 618. Remote computing device(s) 618 can be a PC, a server, a router, a peer device, or other common network node, and typically includes many or all of the elements described herein relative to computing device 600. Communication between computing devices takes place over a network(s) 620, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 612 and related network(s) 620 described herein are exemplary and other means of establishing communication between the computing devices can be used.

As exemplified in FIG. 6, communications connection(s) 612 and related network(s) 620 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 6, computing device 600 also includes an input device(s) 614 and output device(s) 616. Exemplary input devices 614 include, but are not limited to, a keyboard, mouse, pen, touch input device, microphone, and camera, among others. A user can enter commands and various types of information into the computing device 600 through the input device(s) 614. Exemplary output devices 616 include, but are not limited to, a display device(s), printer, and audio output devices, among others. These input and output devices are well known and need not be described at length here.

Referring again to FIG. 6, the OTP technique embodiments described herein can be further described and/or implemented in the general context of computer-executable instructions, such as program modules, which are executed by computing device 600. Generally, program modules include routines, programs, objects, components, and data structures, among other things, that perform particular tasks or implement particular abstract data types. The OTP technique embodiments can also be practiced in a distributed computing environment where tasks are performed by one or more remote computing devices 618 that are linked through a communications network 612/620. In a distributed computing environment, program modules can be located in both local and remote computer storage media including, but not limited to, memory 604 and storage devices 608/610.

Wherefore, what is claimed is:

1. A computer-implemented process for minimizing transmission delays associated with transmitting data packets generated by a local application hosted on a source computer over a data communications network to a remote application hosted on a destination computer, comprising using the source computer to perform the following process actions:
   measuring the currently available bandwidth of the network;
   inputting an initial sequence of the data packets generated by the local application into a transmit queue;
   forming an initial sequence of output packets from the data packets in the transmit queue;
   transmitting the initial sequence of output packets over the network to the remote application during a succession of transmission opportunities, wherein the rate of transmission is started at a rate that does not employ the full amount of the last-measured available bandwidth and is then ramped up to the full amount of the last-measured available bandwidth;
   in conjunction with transmitting the initial sequence of output packets over the network to the remote application, monitoring a transmission delay indicator which is routinely computed using acknowledgement packets received from the destination computer and whenever the indicator specifies that the transmission delay is increasing, reducing said rate of transmission until the indicator specifies that said delay is unchanged;
   remembering the last rate of transmission used to transmit the last output packet to the remote application; and
   following the occurrence of one or more transmission opportunities during which no output packets are transmitted to the remote application, and upon the formation of a subsequent sequence of output packets,
   transmitting the subsequent sequence of output packets over the network to the remote application, wherein the starting rate of transmission is set to be a prescribed percentage of the remembered last rate of transmission and the rate of transmission is ramped up to the measured bandwidth, and
   in conjunction with transmitting the subsequent sequence of output packets over the network to the remote application, monitoring the transmission delay indicator and whenever the indicator specifies that the transmission delay is increasing, reducing said rate of transmission until the indicator specifies that said delay is unchanged.

2. The process of claim 1, wherein the action of measuring the currently available bandwidth of the network comprises an action of transmitting a sequence of probe packets over the network to the destination computer.

3. The process of claim 1, wherein each output packet comprises either a forward error correction packet or a single data packet based on a decision which is dynamically calculated at each transmission opportunity, said decision being based on minimizing transmission delays due to packet loss in the network.

4. A system for transmitting data packets from a local application to a remote application, comprising:
   a source computer on which the local application is hosted, wherein the local application generates a sequence of data packets which are destined for the remote application;
   a destination computer on which the remote application is hosted;
   a data communications network which interconnects the source computer and destination computer, wherein the source computer transmits a sequence of output packets over the network to the destination computer during a succession of transmission opportunities; and
   a computer program having program modules executable by the source computer, comprising,
      a transmission strategy module for dynamically deciding for each output packet, whether the output packet will be a forward error correction (FEC) packet or a single data packet, said decision being based on minimizing the expected time until each data packet becomes useful to the remote application, and
      an encoder module for forming each output packet from one or more data packets based on said decision, and
   wherein upon each transmission opportunity the strategy module is configured to group the sequence of data packets generated by the local application based on the current transmission status of each data packet, said grouping comprising,
      a first set comprising data packets which have already been formed into output packets and transmitted over the network to the destination computer, and are definitively known to have not been successfully received by the destination computer,
      a second set comprising data packets which have already been formed into output packets and transmitted over the network to the destination computer, but no definitive information is known regarding whether or not these data packets have been successfully received by the destination computer, and a third set comprising data packets which have not yet been formed into output packets and transmitted over the network to the destination computer, and whenever there are no data packets in the third set, but there are one or more data packets in the second set at the current transmission opportunity, the strategy module is configured to instruct the encoder module to form the next output packet as an FEC packet.

5. The system of claim 4, wherein whenever there are no data packets in the second set, but there are one or more data packets in the third set at the current transmission opportunity, the strategy module is configured to instruct the encoder module to form the next output packet from the next data packet in the third set.

6. The system of claim 4, wherein the FEC packet comprises a linear combination of data packets in the second set, said linear combination being over a prescribed Galois field.

7. The system of claim 6, wherein the linear combination is given by the equation $$C[l] = \sum_{m=b[l]}^{e[l]} \alpha_l[m] Q[m],$$

wherein m indexes the data packets generated by the local application, l indexes the transmission opportunities, b[l] denotes a prescribed beginning data packet used in said linear combination, e[l] denotes a prescribed ending data packet used in said linear combination, $\alpha_l[m]$ denotes an mth coding coefficient, and Q[m] denotes the mth data packet used in said linear combination.

8. The system of claim 4, wherein whenever there are one or more data packets in both the second and third sets at the current transmission opportunity,
the strategy module is configured to compute a first sum of expected packet transmission delays for the data packets in the second and third sets over a prescribed number N of succeeding transmission opportunities based on the assumption that the next output packet is formed as an FEC packet,
the strategy module is configured to compute a second sum of expected packet transmission delays for the data packets in the second and third sets over the prescribed number N of succeeding transmission opportunities based on the assumption that the next output packet is formed from the next data packet in the third set,
whenever the first sum is less than the second sum, the strategy module is configured to instruct the encoder module to form the next output packet as an FEC packet, and
whenever the first sum is equal to or greater than the second sum, the strategy module is configured to instruct the encoder module to form the next output packet from the next data packet in the third set.

9. The system of claim 8, wherein the sum of expected packet transmission delays is given by the equation $$T = \sum_{m=0}^{M-1} \sum_{l=0}^{N} (\tau[l] + \delta[l] - \gamma[m])(p_m^{(l)} - p_m^{(l-1)}),$$

wherein m indexes the data packets generated by the local application, M denotes the combined total number of data packets in the second and third sets, l indexes the transmission opportunities, $\tau[l]$ denotes a particular point in time at which transmission opportunity l occurs, $\Delta[l]$ denotes the duration of time it takes for an output packet transmitted from the source computer at transmission opportunity l to travel over the network and reach the destination computer, $\gamma[m]$ denotes a particular point in time at which the mth data packet is generated by the local application, and $p_m^{(l)}$ denotes the probability of the destination computer being able to decode the mth data packet after transmission opportunity l.

10. The system of claim 9, wherein whenever the output packets are being transmitted over the network at a rate which exceeds the network's currently available bandwidth, a penalty factor is added to $\Delta[l]$ in order to reduce the probability of the next output packet being formed as an FEC packet.

11. The system of claim 4, wherein whenever there are one or more data packets in both the second and third sets at the current transmission opportunity,
the strategy module is configured to compute a first sum of expected packet transmission delays for the data packets in the second and third sets over a prescribed number N of succeeding transmission opportunities based on the assumption that the next output packet is formed as an FEC packet,
the strategy module is configured to compute a second sum of expected packet transmission delays for the data packets in the second and third sets over the prescribed number N of succeeding transmission opportunities based on the assumption that the next output packet is formed from the next data packet in the third set,
the strategy module is configured to compute a first probability of the first sum being smaller than a prescribed threshold,
the strategy module is configured to compute a second probability of the second sum being smaller than the prescribed threshold,
whenever the first probability is greater than the second probability, the strategy module is configured to instruct the encoder module to form the next output packet as an FEC packet, and
whenever the first probability is equal to or less than the second probability, the strategy module is configured to instruct the encoder module to form the next output packet from the next data packet in the third set.

12. The system of claim 4, wherein the computer program further comprises a probe packets generator module for generating probe packets which are transmitted to the destination computer to measure the network's currently available bandwidth.

13. The system of claim 4, wherein the computer program further comprises a decoder module for decoding the output packets received over the network from the remote application, said decoding comprising extracting the one or more data packets included within each received output packet and delivering said extracted data packets to the local application.

14. The system of claim 4, wherein the computer program further comprises a feedback module for processing acknowledgement (ACK) packets received over the network from the destination computer, said processing comprising routinely computing a one-way packet transmission delay indicator which specifies if the one-way packet transmission delay is increasing, decreasing or unchanged.

15. The system of claim 14, wherein each ACK packet specifies that a particular output packet was successfully received by the destination computer or is considered lost as a later output packet was successfully received by the destination computer.

16. A computer-implemented process for minimizing transmission delays associated with transmitting data packets generated by a local application hosted on a source computer over a data communications network to a remote application hosted on a destination computer, comprising using the source computer to perform the following process actions:

measuring the currently available bandwidth of the network by transmitting a sequence of probe packets over the network to the destination computer;

inputting an initial sequence of the data packets generated by the local application into a transmit queue;

forming an initial sequence of output packets from the data packets in the transmit queue, wherein each output packet comprises either a forward error correction (FEC) packet or a single data packet based on a decision which is dynamically calculated at each transmission opportunity, said decision being based on minimizing transmission delays due to packet loss in the network;

transmitting the initial sequence of output packets over the network to the remote application during a succession of transmission opportunities, wherein the rate of transmission is ramped up to the measured bandwidth;

in conjunction with transmitting the initial sequence of output packets over the network to the remote application, monitoring a transmission delay indicator which is routinely computed using acknowledgement packets received from the destination computer and whenever the indicator specifies that the transmission delay is increasing, reducing said rate of transmission until the indicator specifies that said delay is unchanged;

remembering the last rate of transmission used to transmit the last output packet to the remote application; and following the occurrence of one or more transmission opportunities during which no output packets are transmitted to the remote application, inputting a subsequent sequence of the data packets generated by the local application into the transmit queue, forming a subsequent sequence of output packets from the data packets in the transmit queue, wherein each output packet comprises either an FEC packet or a single data packet based on a decision which is dynamically calculated at each transmission opportunity, said decision being based on minimizing transmission delays due to packet loss in the network, transmitting the subsequent sequence of output packets over the network to the remote application, wherein the starting rate of transmission is set to be a prescribed percentage of the remembered last rate of transmission and the rate of transmission is ramped up to the measured bandwidth, and in conjunction with transmitting the subsequent sequence of output packets over the network to the remote application, monitoring the transmission delay indicator and whenever the indicator specifies that the transmission delay is increasing, reducing said rate of transmission until the indicator specifies that said delay is unchanged.

* * * * *